Sept. 14, 1926. Re. 16,420
T. A. BOYD ET AL
DOFFING MECHANISM FOR SPINNING, TWISTING, AND LIKE FRAMES
Original Filed Sept. 4, 1925
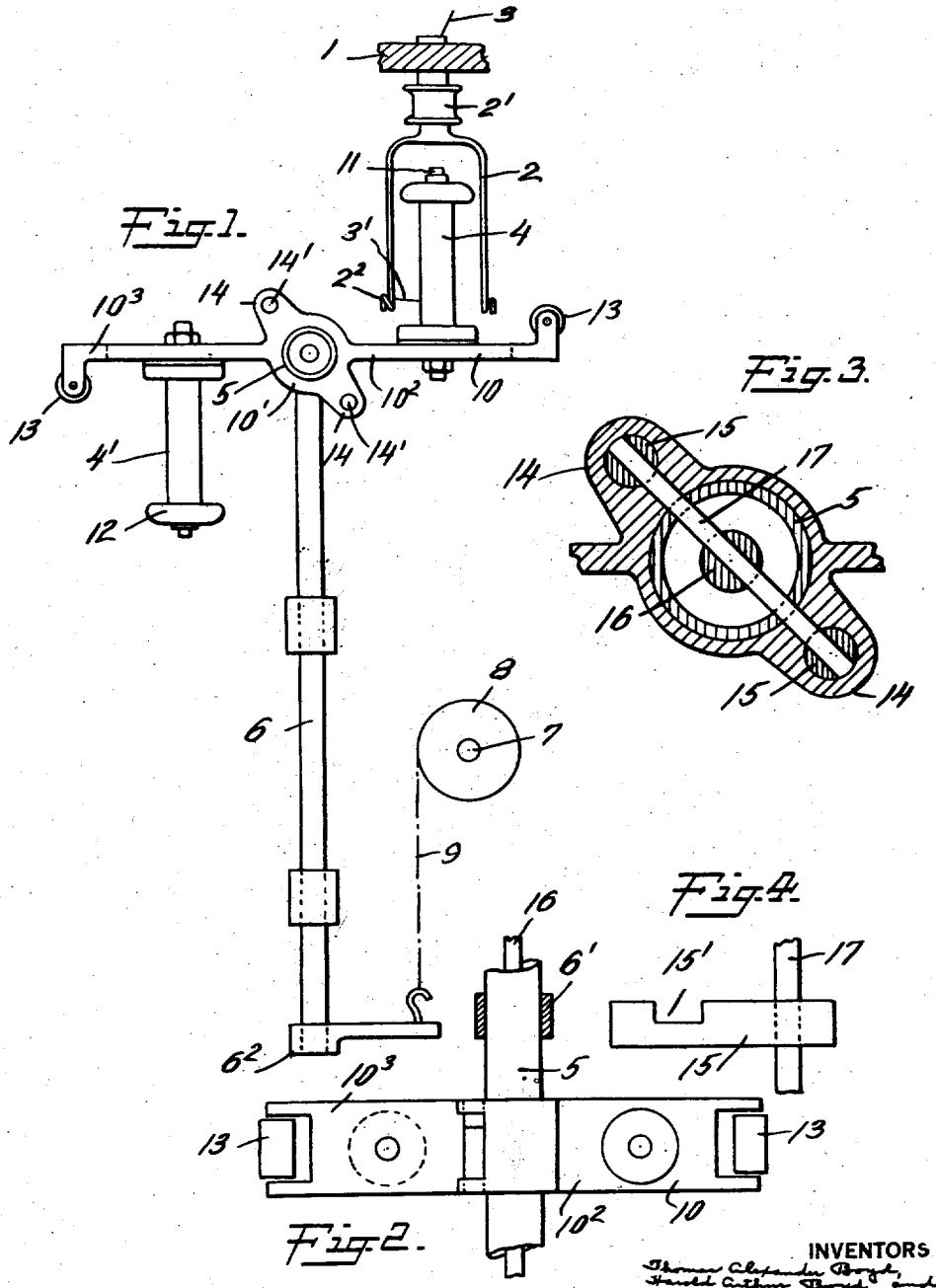
INVENTORS
Thomas Alexander Boyd,
Harold Arthur Boyd, and
BY James Boyd
Pennie Davis Marvin & Edmonds
ATTORNEYS Reissued Sept. 14, 1926. Re. 16,420

UNITED STATES PATENT OFFICE.

THOMAS ALEXANDER BOYD, HAROLD ARTHUR BOYD, AND JAMES BOYD, OF SHETTLESTON, NEAR GLASGOW, SCOTLAND.

DOFFING MECHANISM FOR SPINNING, TWISTING, AND LIKE FRAMES.

Original No. 1,565,782, dated December 15, 1925, Serial No. 54,439, filed September 4, 1925, and in Great Britain November 26, 1924. Application for reissue filed July 31, 1926. Serial No. 126,303.

This invention refers to spinning, twisting or like frames in which the flyers are driven and full bobbins removed from spinning position and empty bobbins put in their place by doffing mechanism and in which the bobbins are mounted on rotatable carriers each of which carries two or more bobbins for each flyer, the bobbins being in the same vertical plane as the relative flyer and the bobbins and their spindles so disposed that each bobbin as it is moved into working position shall be coaxial with the flyer, the axle member or members on which the bobbin carriers are mounted being disposed horizontally at a suitable height and distance in relation to the flyer legs, whether behind or in front of the flyers, or in the same vertical plane as the flyers. According to the invention the axle member or members is or are bored axially to receive a rod or other member adapted to operate yarn cutting devices or other doffing mechanism for a group of spindles. The bearings for the axle member or members are carried on pokers or slides which are traversed up and down by ordinary traverse mechanism. When a bobbin has been filled with yarn and the machine stopped, the bobbin carrier and axle member are rotated until the full bobbin is carried clear of the flyer and an empty bobbin carried into working position. Surplus thread is wound from the full on to the empty bobbin and the yarn is then severed by actuation of the rod.

In the accompanying drawings Fig. 1 is an end section view showing the arrangement of the bobbins in relation to the flyer in a spinning frame for worsted. Fig. 2 is a plan view of the bobbin carrier and Figs. 3 and 4 respectively, a section and a plan of the cutting device.

1 denotes a stationary horizontal top flyer rail which in practice extends along one side of the frame. In the rail 1 are mounted at suitable distance apart, with their axes vertical, flyers 2 having depending legs and each having near its upper end below the rail 1 a wharve $2^1$ by which it may be driven by a tape in usual manner. The yarn 3 to be spun passes down through the flyer bearing to the curl $2^2$ at the end of one flyer leg and thence to the spinning bobbin 4. At a suitable distance in front of the flyers and slightly below the flyer curls $2^2$ when at its highest position we mount a tube 5 disposed horizontally and parallel with the rail 1. The tube 5 is supported for rotation in spaced bearings $6^1$ carried at the upper ends of vertical poker slides 6 to which is imparted a traverse down and up. At a suitable distance behind the slides 6 is a traverse shaft 7 on which is fixed for each slide a chain pulley 8 from which a chain 9 extends to the lower end $6^2$ of the slide. Oscillatory motion is imparted to the shaft 7 by usual mechanism. Opposite each flyer there is mounted on the tube 5 a bobbin carrier 10 having a boss $10^1$ embracing the tube 5. On the arm $10^2$ of the bobbin carrier is mounted an upper stud 11 coaxial with the flyer 2, and on the stud 11 is impaled the spinning bobbin 4 on to which the yarn is spun. On the arm $10^3$ of the bobbin carrier 10 is fixed a lower stud 12 parallel with the stud 11 and so positioned that, when the tube 5 and bobbin carrier 10 perform a semi-rotation about the axis of the tube, the stud 11 and bobbin and the stud 12 and bobbin change places. Thus, when the upper spinning bobbin 4 has been filled, the frame is stopped and the bobbin carrier 10 given one half rotation whereby the full bobbin 4 is carried from its position in line with the flyer 2 to the front of the tube 5 and inverted. By the same movement the empty bobbin $4^1$ is carried into spinning position. Provision is made to prevent the bobbin 4 when inverted from falling off its spindle. When the full bobbin 4 has passed from Fig. 1 position forward and downwards, it carries with it the spun thread $3^1$ extending from the flyer leg $2^2$. The flyer 2 is now given a few rotations to wind yarn from the full bobbin 4 back to the empty bobbin $4^1$ ready to be severed and to start spinning. To facilitate this winding from bobbin to bobbin a pair of anti-friction rollers 13 are mounted on the bobbin carrier 10. On the boss $10^1$ of the bobbin carrier 10 are formed ribs 14 through each of which is bored a hole $14^1$ parallel with the tube 5. In the hole in each rib is mounted a cylindrical plunger 15 so as to be an easy fit. The rib and plunger are notched, affording a passage $15^1$ into which the yarn passes from the flyer 2 to the doffed bobbin, so that when the plunger 15 receives an endwise movement it will sever the yarn. Motion is imparted to the plunger 15 by a rod 16 mounted within the tube 5 and fitted with pins 17 each extending through slots in the ribs 14 and boss $10^1$ of the relative bobbin carrier and entering diametral orifices in the plungers 15 so that when the rod 16 is moved endwise it entrains the plungers 15, and thus severs the yarn $3^1$. After the yarn $3^1$ is severed, the frame is re-started. The full bobbins 4 are then removed and empty bobbins $4^1$ put in their places.

What we claim is:—

1. In a spinning, twisting or like frame, in combination, a flyer rotatable on a vertical axis, an axially bored axle member rotatable on a horizontal axis, a bobbin carrier mounted on said axle member, said carrier serving to support a plurality of bobbins in the same vertical plane as said flyer and adapted on rotation with said axle member to bring the bobbin to be filled into coaxial relation with said flyer, and yarn cutting means including a member movable in the bore of said axle member.

2. In a spinning, twisting or like frame, in combination, a flyer rotatable on a vertical axis, an axially bored axle member rotatable on a horizontal axis, a bobbin carrier mounted on said axle member, said carrier serving to support a plurality of bobbins in the same vertical plane as said flyer and adapted on rotation with said axle member to bring the bobbin to be filled into coaxial relation with said flyer, and yarn cutting means including a rod movable in the bore of said axle member, and yarn-engaging plungers, one for each bobbin, connected to said rod.

3. In a spinning, twisting or like frame, in combination, a flyer rotatable on a vertical axis, an axially bored axle member rotatable on a horizontal axis non-planar with the axis of said flyer, a bobbin carrier mounted on said axle member, said carrier serving to support a plurality of bobbins in the same vertical plane as said flyer and adapted on rotation with said axle member to bring the bobbin to be filled into coaxial relation with said flyer, and yarn cutting means including a member movable in the bore of said axle member.

4. In a spinning, twisting or like frame, in combination, a flyer, a rotatable carrier, bobbin supporting studs on said carrier, bobbins impaled on said studs adapted to be brought successively into operative relation with said flyer to be filled and to be replaced when full and a pair of anti-friction rollers fitted to said carrier to facilitate the winding of yarn from a full bobbin to an empty bobbin about to be filled.

5. In a spinning, twisting or like frame, in combination, a flyer, a tubular axle member, a bobbin carrier mounted on said axle member and rotatable to bring a bobbin to be filled into operative relation with said flyer, a yarn cutter and a rod movable within said tubular axle member to operate said cutter.

6. In a spinning, twisting or like frame, in combination, a horizontal flyer rail, a flyer supported by said rail for rotation on a vertical axis, a horizontal axle member parallel to said rail and non-planar with the axis of said flyer, and a bobbin carrier mounted on said axle member for rotation upon the axis of said member, said carrier serving to support a plurality of bobbins in the same vertical plane as said flyer and adapted on rotation to bring the bobbin to be filled into coaxial relation with said flyer.

In testimony whereof we affix our signatures.

THOMAS ALEXANDER BOYD.
HAROLD ARTHUR BOYD.
JAMES BOYD.